H. OSBORN.
ATTACHMENT FOR FRYING PANS.
APPLICATION FILED MAR. 22, 1911.

1,021,425.

Patented Mar. 26, 1912.

Witnesses
Jos. A. Ryan
Chas. E. Richardson

Inventor
Harry Osborn
By Wm C. McIntire
Attorney

COLUMBIA PLANOGRAPH CO., WASHINGTON, D. C.

UNITED STATES PATENT OFFICE.

HARRY OSBORN, OF BUCKLEY, WASHINGTON.

ATTACHMENT FOR FRYING-PANS.

1,021,425.

Specification of Letters Patent.

Patented Mar. 26, 1912.

Application filed March 22, 1911. Serial No. 616,250.

*To all whom it may concern:*

Be it known that I, HARRY OSBORN, a citizen of the United States, residing at Buckley, in the county of Pierce and State of Washington, have invented certain new and useful Improvements in Attachments for Frying-Pans; and I do hereby declare the following to be a full, clear, and exact description of the invention, such as will enable others skilled in the art to which it appertains to make and use the same.

This invention relates to new and useful improvements in attachments for frying pans.

An object of this invention is the provision of a device of this character, which when applied will prevent the frying pan from tilting on account of the overbalance caused by the weight of the handle thereof when the same is of an unusual length.

Another object of this invention is to improve and simplify devices of this character, rendering them comparatively simple and inexpensive to manufacture, reliable and efficient in use and readily operated.

With the above and other objects in view, this invention resides in the novel features of construction, formations, combinations and arrangement of parts to be hereinafter more fully described, claimed and illustrated in the accompanying drawing, in which—

Figure 1:
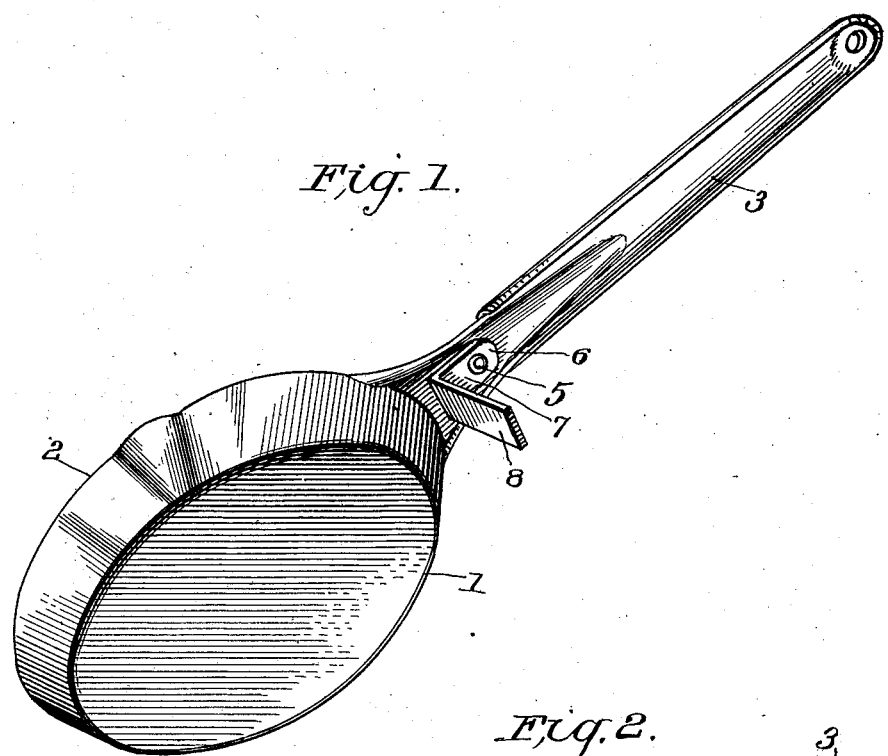
Figure 2:
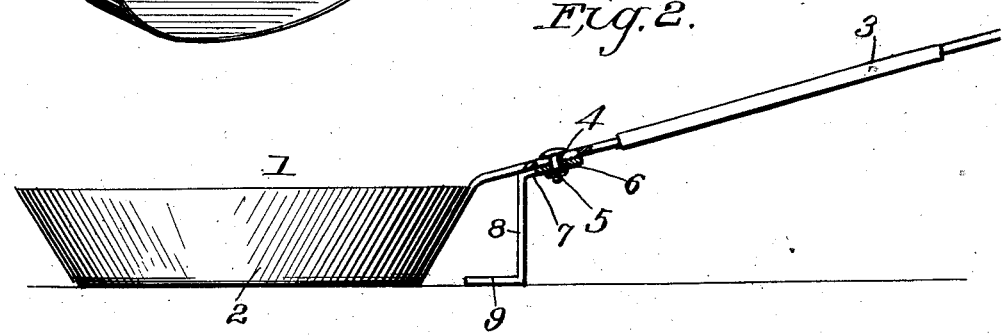

Figure 1 is a perspective view of a frying pan with my improved attachment applied, and Fig. 2 is a side elevation of a frying pan illustrating a modified form of attachment applied.

Referring to the drawings by characters of reference the numeral 1 designates generally a frying pan of the customary type, comprising a body portion or receptacle 2, having either formed integral or secured to one end thereof the usual handle 3. The intermediate portion of the handle adjacent the edge of the body portion 2 is apertured as at 4, for the reception of a bolt or rivet 5, which extends therethrough and through an aperture 6 formed in the upper offset end 7 of a substantially vertically extending depending plate 8. The lower extremity of this plate 8 is in the same horizontal plane as the bottom of the receptacle or body portion 2, and is adapted when the same is applied to a stove to contact with the upper edge thereof and form a support which prevents the pan from tilting in case any unusual weight is applied to the end of the handle 3.

The lower extremity of the plate 4 may be offset as indicated by the numeral 9, to provide a means whereby the pan may be carried by a person who desires to use the same in traveling or camping.

From the foregoing disclosure it will be manifest that an attachment of the character described is provided for which will fulfil all of the necessary requirements of such a device.

Having thus fully described this invention, what I claim as new and desire to secure by Letters Patent is:

The combination with a cooking utensil having a handle extending therefrom, of a support secured thereto adjacent to the cooking utensil, said support comprising a rectangular strip of material bent at right angles toward the cooking utensil at the lower or bearing terminal thereof, and bent to the angle of the handle at the opposite terminal, and securing means piercing said last named bent portion and said handle.

In testimony whereof I affix my signature in presence of two witnesses.

HARRY OSBORN.

Witnesses:
JAMES McNEELY,
C. O. SEBERG.

Copies of this patent may be obtained for five cents each, by addressing the "Commissioner of Patents, Washington, D. C."